(No Model.) 8 Sheets—Sheet 1.

J. A. MARKOE.
MECHANICAL VOTING MACHINE.

No. 587,222. Patented July 27, 1897.

WITNESSES
Philip N. Tilden.
J. G. Meyers Jr.

INVENTOR
John A. Markoe,
By Geo. N. Rea
Attorney (No Model.) 8 Sheets—Sheet 3.
J. A. MARKOE.
MECHANICAL VOTING MACHINE.

No. 587,222. Patented July 27, 1897.

WITNESSES
Philip N. Tilden
J. T. Meyers

INVENTOR
John A. Markoe,
By Geo. N. Rea,
Attorney (No Model.) 8 Sheets—Sheet 4.

J. A. MARKOE.
MECHANICAL VOTING MACHINE.

No. 587,222. Patented July 27, 1897.

WITNESSES
Philip N. Tilden.
J. G. Meyers Jr.

INVENTOR
John A. Markoe,
By Geo. W. Rea.
Attorney (No Model.)  8 Sheets—Sheet 5.

J. A. MARKOE.
MECHANICAL VOTING MACHINE.

No. 587,222. Patented July 27, 1897.

WITNESSES
Philip N. Tilden
J. G. Meyers Jr

INVENTOR
John A. Markoe,
By Geo. W. Rea
Attorney (No Model.) 8 Sheets—Sheet 6.
J. A. MARKOE.
MECHANICAL VOTING MACHINE.
No. 587,222. Patented July 27, 1897.
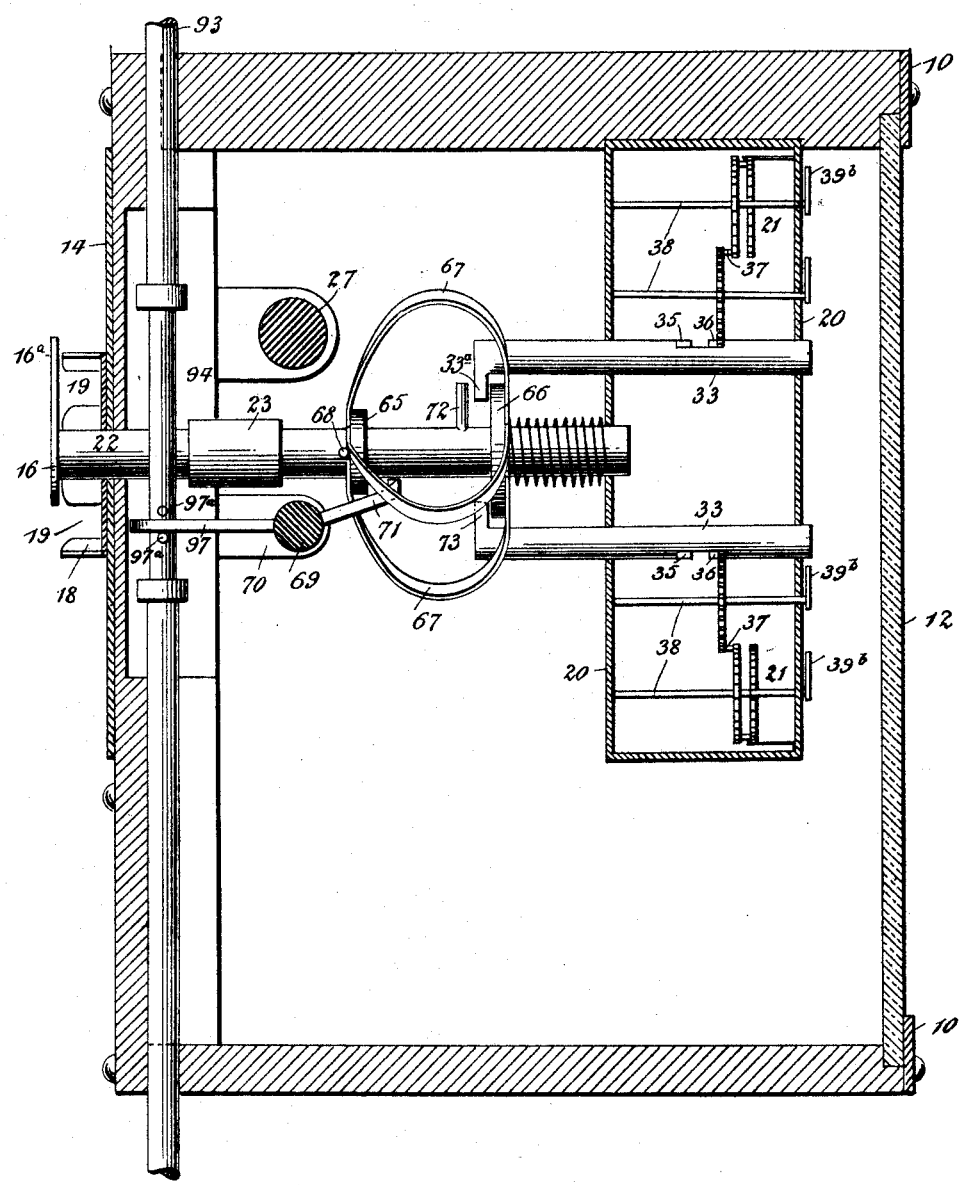
Fig: 6.
WITNESSES
Philip N. Tilden.
J. G. Meyers Jr.
INVENTOR
John A. Markoe
By Geo. W. Rea
Attorney (No Model.)
8 Sheets—Sheet 7.
J. A. MARKOE.
MECHANICAL VOTING MACHINE.
No. 587,222. Patented July 27, 1897.
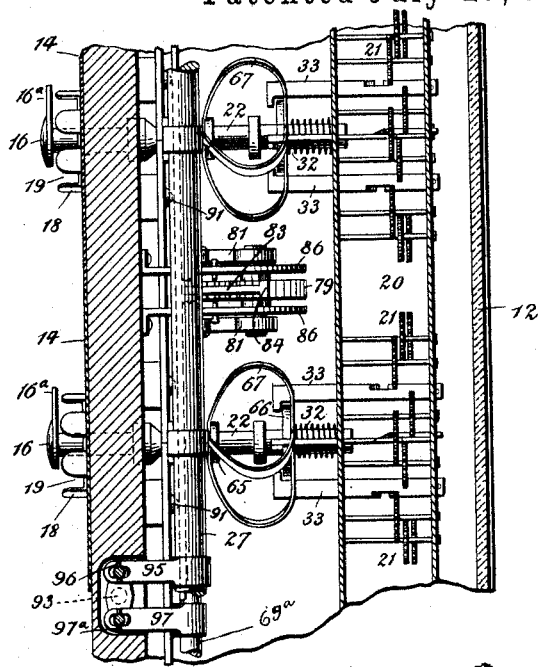
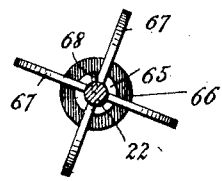
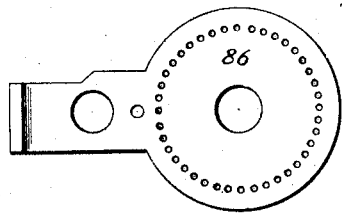
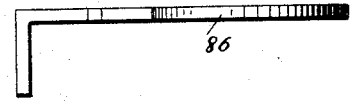
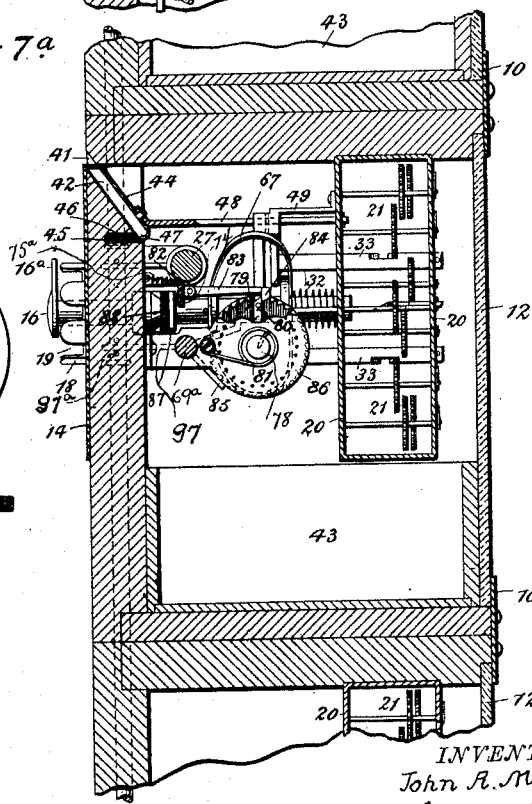
WITNESSES
Philip N. Tilden.
J. G. Meyers Jr.
INVENTOR
John A. Markoe,
By Geo. N. Rea
Attorney (No Model.) 8 Sheets—Sheet 8.

J. A. MARKOE.
MECHANICAL VOTING MACHINE.

No. 587,222. Patented July 27, 1897.

WITNESSES
Philip N. Tilden.
J. G. Meyers Jr.

INVENTOR
John A. Markoe,
By Geo. N. Rea.
Attorney

UNITED STATES PATENT OFFICE.

JOHN A. MARKOE, OF WHITE BEAR, MINNESOTA, ASSIGNOR TO LORENZO J. MARKOE, OF SAME PLACE.

MECHANICAL VOTING-MACHINE.

SPECIFICATION forming part of Letters Patent No. 587,222, dated July 27, 1897.

Application filed January 21, 1897. Serial No. 620,037. (No model.)

*To all whom it may concern:*

Be it known that I, JOHN A. MARKOE, a citizen of the United States of America, residing at White Bear, in the county of Ramsey and State of Minnesota, have invented certain new and useful Improvements in Mechanical Voting-Machines, of which the following is a specification.

My invention relates to improvements in voting-machines, and has for its object to improve the construction, arrangement, and operation of such machines; to which end the invention consists in the novel construction, combination, arrangement, and operation of parts, as hereinafter set forth and claimed, reference being had to the accompanying drawings, in which—

Figure 1:
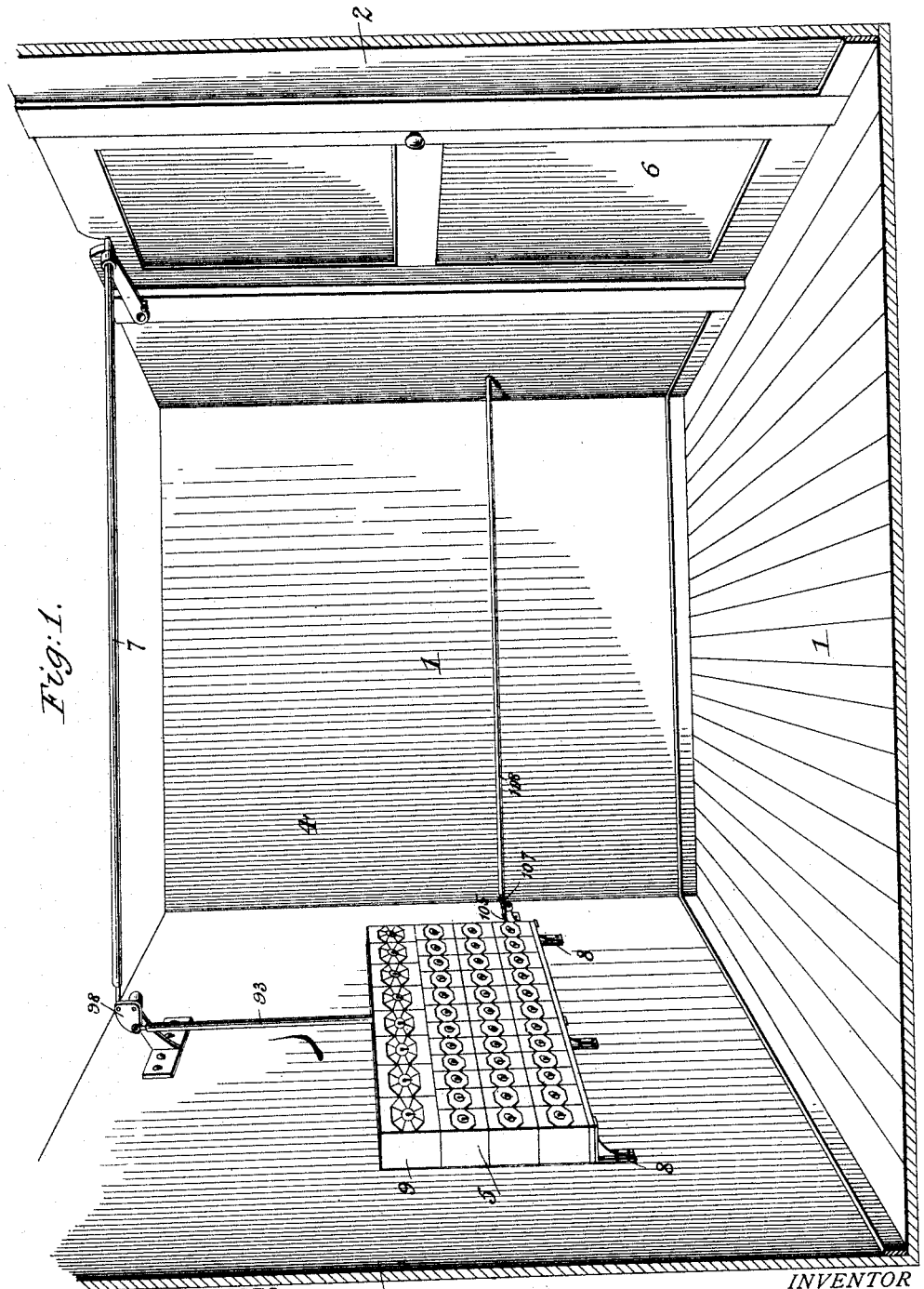
Figure 2:
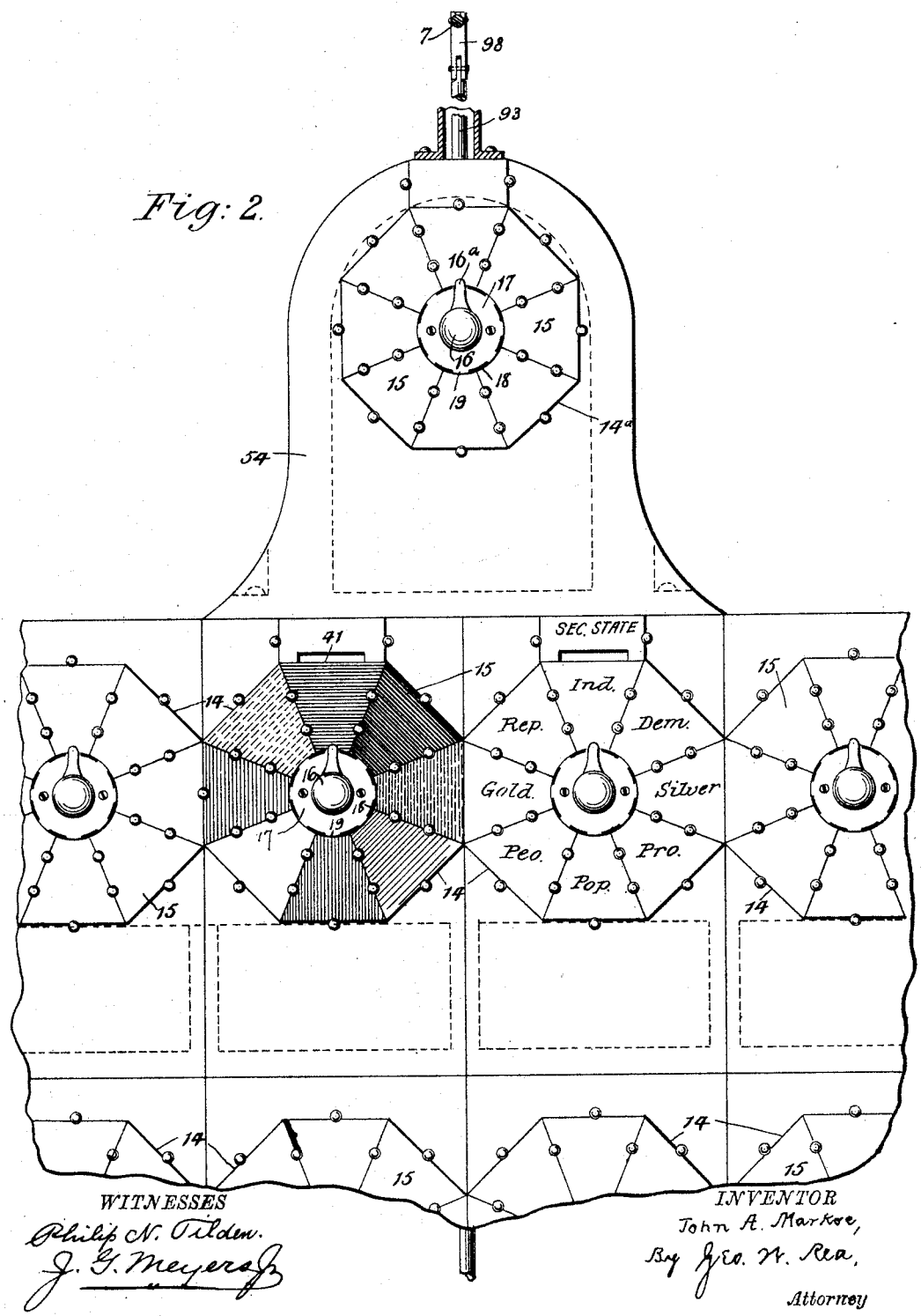
Figure 3:
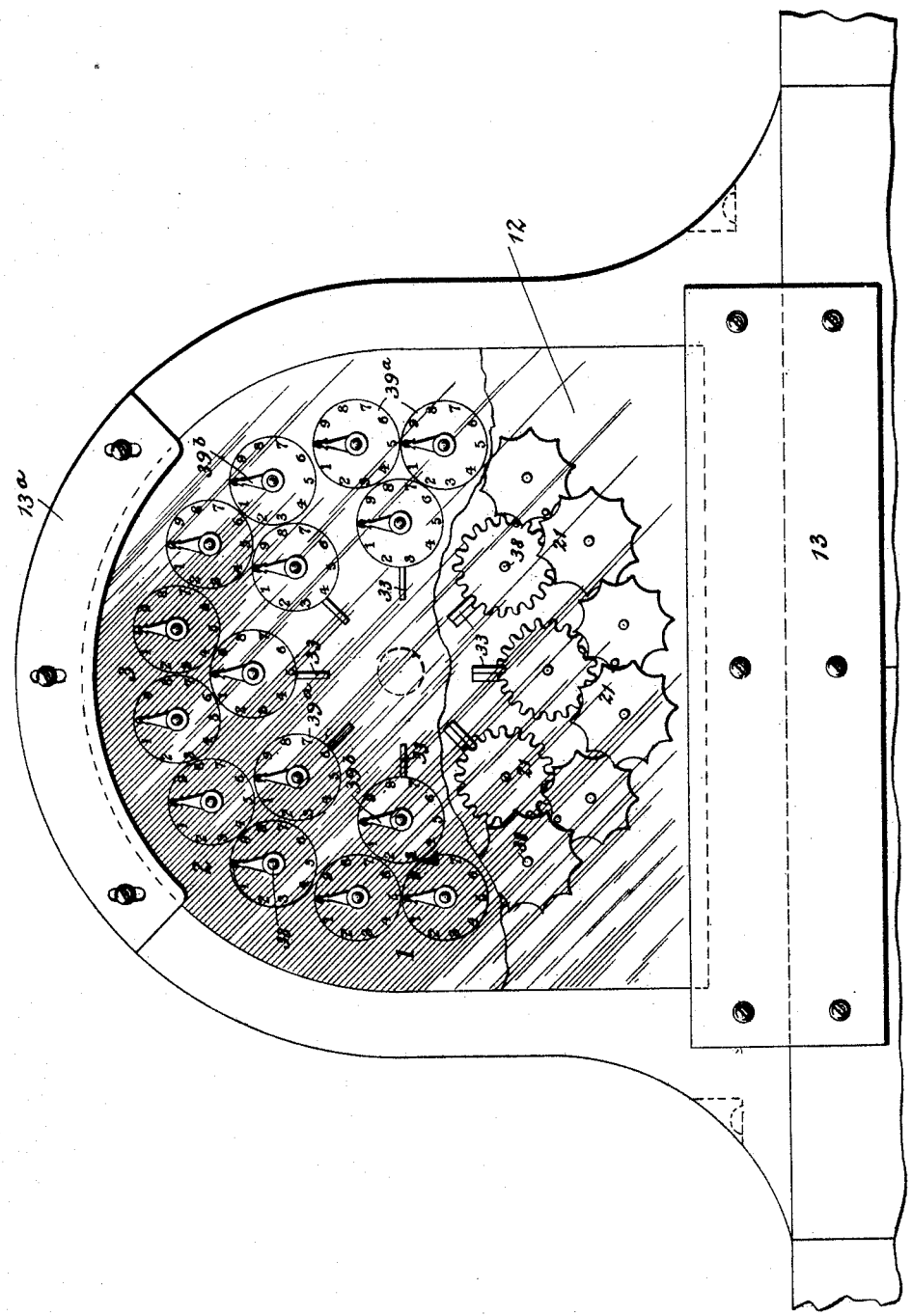
Figure 4:
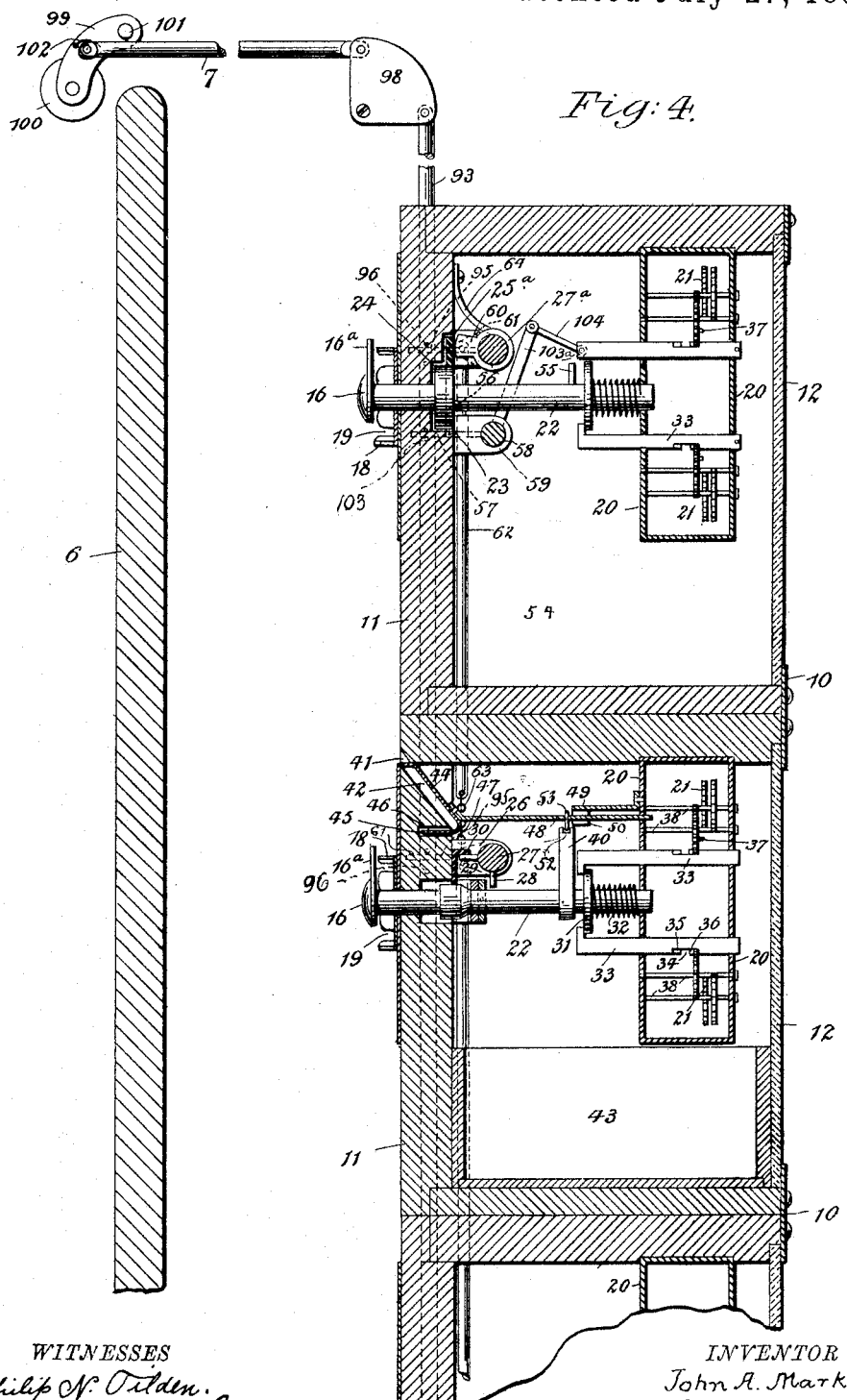
Figure 5:
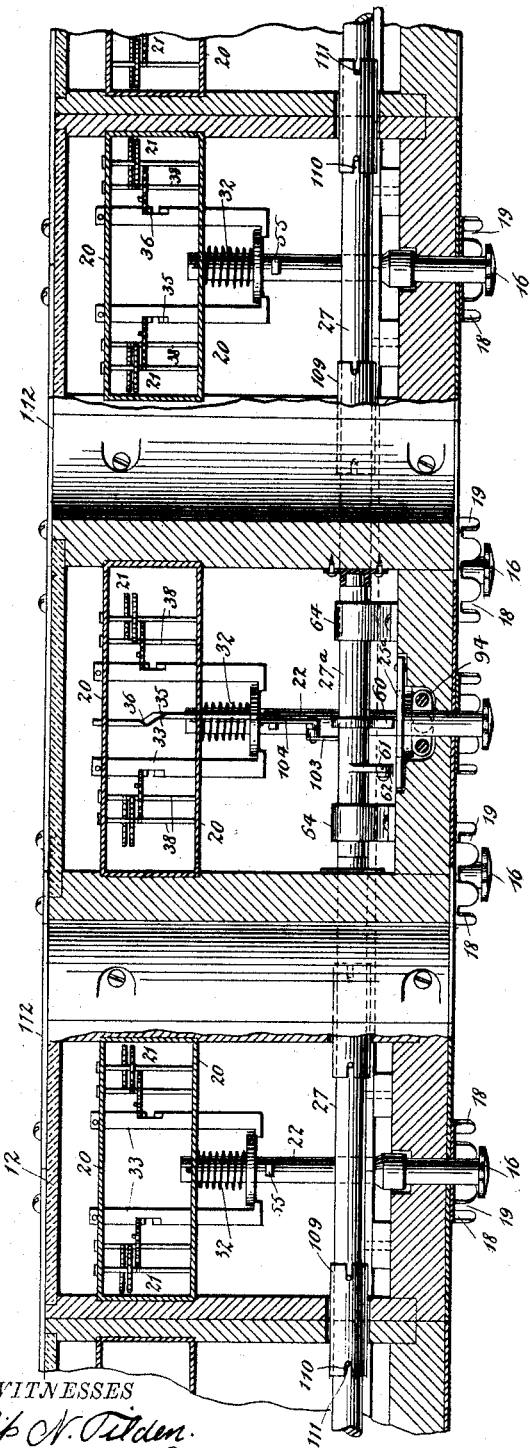
Figure 8:
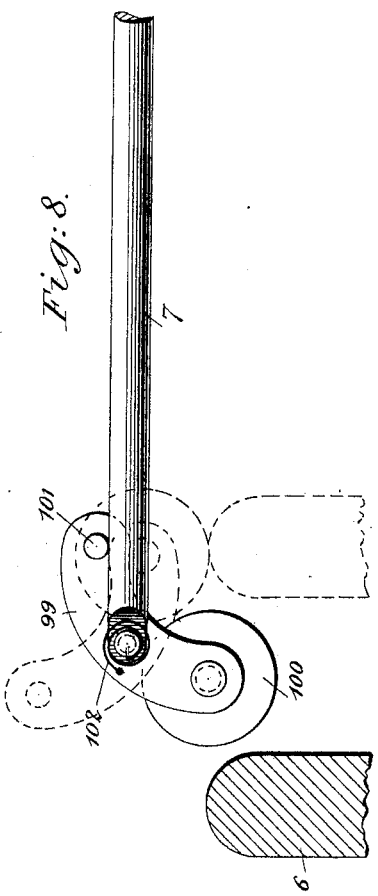
Figure 11:
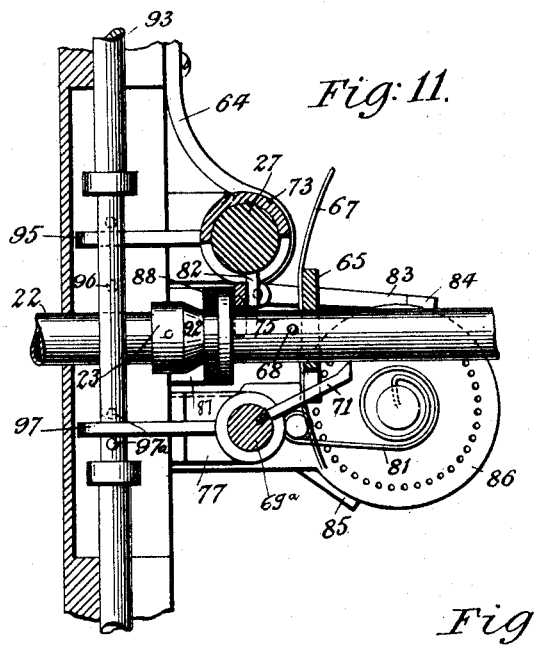
Figure 12:
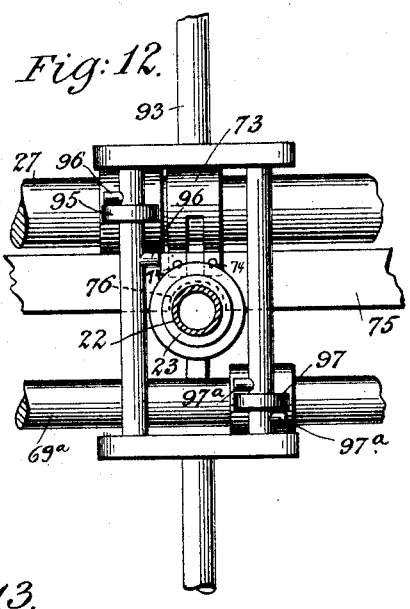
Figure 13:
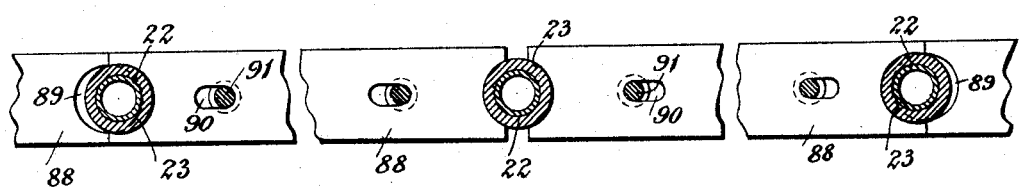
Figure 14:
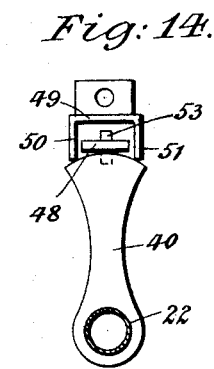
Figure 15:
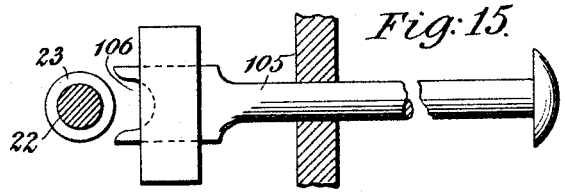
Figure 16:
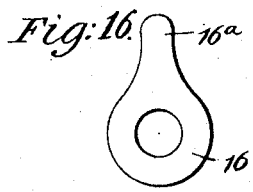
Figure 17:
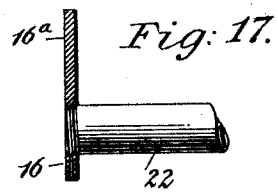
Figure 18:
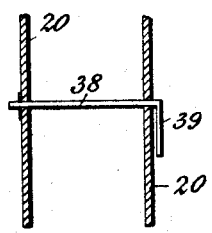

Figure 1 is a perspective view of a voting-booth supplied with my improved voting apparatus. Fig. 2 is a face view illustrating several of the voting-dials. Fig. 3 is a rear view of a straight-ticket mechanism, showing the glass covering-plate, the means for holding it removably in place, and being broken away in part to show the counting-wheels, said parts being alike in all the different specific mechanisms. Fig. 4 is a vertical central sectional view through the voting mechanism and illustrating the connection with the door by which the votes initiated by the voter are completed and the mechanism restored to voting position, ready for the following voter. Fig. 5 is a horizontal section in two different planes, showing the top dial mechanism and the mechanism of the case upon which it is supported. Fig. 6 is a sectional view of the mechanism for voting for or against constitutional amendments. Figs. 7 and 7ª illustrate in horizontal and vertical section the mechanism for cumulative voting. Fig. 8 is an enlarged view of the roller operated by the door to throw the push-rod-releasing mechanism. Fig. 9 is a detail of the sliding cage in the cumulative-voting mechanism. Fig. 10 shows a face and an edge view of the regulating-plate for controlling the number of votes to be cast in this mechanism. Fig. 11 is a detail, in side view, of parts of this mechanism. Fig. 12 is a front view thereof. Fig. 13 is a face view of the sectional barrier to prevent the simultaneous operation of two or more push-rods in said cumulative-voting mechanism. Fig. 14 is a detail of parts of the paper or other ballot mechanism. Fig. 15 is a detail of means for preventing a voter from voting when he has failed to pay poll-tax for the particular dial. Fig. 16 is a face view of the selection-button; Fig. 17, a detail of its connection with the push-rod, and Fig. 18 a detail of one form of indicator-dial pointer.

In the said drawings, the reference-numeral 1 represents a voting-booth made up of a front 2, a back 3, and sides 4. Within the booth is arranged my improved voting apparatus 5, which is adapted for national, State, county, and local and other elections. If it be found desirable, more than one apparatus may be provided in the booth, suitable connection being made with the releasing mechanism operated by the booth-door, as will be obvious to one skilled in the art.

The booth is provided with a door 6, operatively connected with mechanism 7, fully hereinafter described, for completing the votes initiated by the voter and restoring the voting apparatus 5 to normal position ready for the next voter. At the rear of the booth a removable panel is provided for inspection of the indicating-dials of the apparatus. This apparatus 5 is supported against one of the walls of the booth 1 upon suitable brackets 8 and consists of a suitable number of cases, say three, arranged in a series, one upon the other, as shown. These cases 9 are firmly secured to each other by means of devices such as cleats 10 or in other suitable manner. Each case comprises a front panel 11 to support the manipulating devices herein described and a back plate of glass or other transparent material 12, so that the vote-indicating pointers may be seen. The glass plate 12 is secured to the case by means of a fixed confining-plate 13 at the bottom and a movable plate 13ª at the top, the latter being capable of being moved to permit the removal of the glass plate 12, if occasion require, as to move the counting-wheels back to zero or to remove from the apparatus the paper or other ballot votes cast for an unregistered independent candidate.

Each case is provided with a series of card-dials 14, of which, for convenience, eight are shown in the drawings, made up of cards 15, grouped radially about a selection-button 16, as many cards being provided as there are political parties and registered independents standing for election. The respective cards 15 are marked with the name of a political party — as "Republican," "Democratic," "People's party," "Silver party," "Prohibition party," &c., and "Independent"—the cards of the several parties being arranged in the same relative position in each dial throughout the apparatus. To aid voters unable to read, the several parties may also be designated by cards of distinctive colors.

Centrally arranged within the several dials is a guide-plate 17, provided with a lateral flange 18, having recesses 19, one for each party-card 15 and located directly in front thereof. Within the case, near the rear thereof and in line with each dial, supported in a housing 20, I provide a series of counting mechanisms, each such mechanism consisting of eight radially-grouped sets of independent counting-wheels 21. The set of counting-wheels 21 for counting the votes for the Republican candidate are located directly in rear of and in line with the card of that party upon the dial 14 at the front of the case, and the counting-wheels 21 for counting the votes of all other party candidates are likewise arranged with respect to the cards of that party in the dial.

Cutting the axis of the guide-plate 17 of each dial is an opening through which passes a rotatable counter-actuating push-rod 22, carrying at its outer end the selection-button 16, preferably threaded thereon, as shown in Fig. 17 of the drawings, and provided with a projecting indicator 16$^a$. A collar 23 is formed on or rigidly secured to the push-rod 22 a short distance from the selection-button and within the case, which when the rod is in its normal or outward position seats in a recess 24 in the front panel 11 and supports as a base a gravity-latch 25. Brackets 26 are secured to the front panel 11 of the case, in which brackets a rotating shaft 27 is journaled and which extends along the case just above the series of push-rods 22. This shaft is provided with a series of fingers 28, arranged in the path of the collars 23, so that when a rod 22 is pushed in to effect a vote said collar will move a finger 28, rotate the shaft 27, carrying an attached latch-holder 29, from beneath a lug 30 on the latch 25, permitting the latter to drop in front of the collar 23, locking the push-rod 22 and preventing its withdrawal and the possibility of a fraudulent second vote for the same or other candidate in that dial. In this locked position the rod 22 remains until released by the opening of the door of the booth, as hereinafter described.

The rear end of each push-rod 22 rests in an opening in the side of the wheel-housing 20, which supports the corresponding counting mechanism, and near that end is provided with a fixed collar 31. A spiral spring 32 surrounds the rear end of each push-rod 22 and at its ends bears against the wall of the wheel-housing 20 and the said collar 31, tending normally to force said rod outwardly into position to be actuated by a voter when the rod is free to obey its impulse. Each wheel-housing 20 supports a series of eight slides 33, which are capable for forward-and-return sliding movement therein, the several slides being arranged in operative relation to the several sets of counting-wheels 21. Each slide is provided with a recess 34, into which the teeth of the units-wheels of the several sets of counting-wheels project, the walls of which recess are oppositely inclined to form opposing cam-faces 35 36, one of which engages a tooth of said units-wheel in the forward travel of the slide, moving said wheel the distance of one tooth, and the other of said cam-faces engages the next tooth of said wheel in the return movement of the slide, likewise advancing the wheel the distance of one tooth.

The sets of counting-wheels 21 are composed of, say, three wheels, to count units, tens, and hundreds, though a fourth or a fifth wheel may be added to count thousands and tens of thousands, if necessary. Each wheel, except the units-wheel, is composed of ten teeth. The units-wheel has twenty. According to my invention a forward-and-return movement of a slide 33 is necessary to effect a single vote, the return movement of the slide in all the illustrated and described arrangements of mechanism for general and special classes of voting being effected through the push-rod appurtenances and connected mechanism by the opening of the door of the booth, as hereinafter set forth.

The movement of the units-wheel during ten forward and ten return movements of its actuating-slide advances the tens-wheel of the set by means of a pin 37 on the units-wheel, which engages a tooth of the tens-wheel at each rotation of the former, the movement of the hundreds-wheel being effected in like manner from the tens-wheel, and so on. The several wheels of each set 21 are mounted on axes 38, supported in the walls of the housing 20, one end of each axle at the rear of the housing being bent, as at 39, Fig. 18 of the drawings, to form a pointer for the units, tens, and hundreds dials 39$^a$, Fig. 3, provided on the rear wall of said housing. Instead of being integral with the axes, the pointers may be separate fingers 39$^b$, secured thereto, as in Fig. 3 of the drawings.

The numeral 40 indicates an arm secured to each push-rod 22, projecting therefrom in the direction in which the indicator 16$^a$ of the selection-button 16 extends, so that whatever the position of the indicator in the rotation of the rod the position of the arm 40 will correspond thereto. When the indicator is turned to the card of a particular candidate in the dial and the rod pushed in, the arm 40 will carry the corresponding slide 33 forward, moving the units-wheel one tooth through the cam-face 35.

In my voting-machine I contemplate the use of one dial in a case for presidential and vice-presidential electors, one for governor of State, and likewise one for each State or other office, the dials for the respective offices being provided with the cards of each political party, as hereinbefore stated, and having also the name of the candidate thereon. It will be understood, however, that a greater number of dials for such offices may be provided, if necessary, under particular conditions.

Let it be supposed, now, that a voter desires to vote for the Republican electors, the Democratic candidate for governor, &c. He will enter the booth at the door thereof, thereby releasing all the push-rods or any that may be locked, as will be described, unless he be the first voter, in which event all the rods will be in condition to commence voting. The indicator 16ª of the selection-button 16 is turned to that recess of the guide-plate 17 which is located in front the Republican card or Democratic card in the dial, as the case may be, whereby the push-rod 22 is rotated, carrying the arm 40 into alinement with the slide 33, which actuates the corresponding counting-wheels 21. Then the rod is pushed in, the arm 40 engaging the slide 33, throwing it forward, whereupon, through the medium of the cam-face 35, the units-wheel is advanced one tooth. In the meantime the collar 23 will have, through the finger 28, moved the latch-holder 29 from beneath the lug 30 of the gravity-latch 25 and the latter have dropped in front of said collar, locking the push-rod 22 in and preventing, until it be released, another vote for the same or other candidate for the same office. The mechanism has now initiated a vote, which is completed when the voter passes from the booth.

Frequently voters desire to vote for persons not registered and appearing on the printed cards as candidates. To provide for these, the top card of each dial is appropriately marked and appropriately colored. Immediately above the card is the opening 41 of a ballot-slot 42, leading to the interior of the case above a ballot-receiving box 43. This slot is normally closed against the reception of a ballot by the flanged end of a plate 44, the lower end of which is provided with a cut-off 45, seating in a recess 46 in the case. The plate is slotted at the junction of the cut-off therewith, as at 47, and has an extension 48, the free end of which passes into the wheel-housing 20. Secured to the housing is a spring 49, the nose of which is composed of two members 50 51 (see Fig. 14 of the drawings) and engages a pin 53 in the extension 48, maintaining the ballot-slot opening 41 normally closed. When it is desired to vote an unregistered candidate, the selection-button 16 is turned until its indicator 16ª registers with the guide-recess in front of the unregistered-candidate card, the rod 22 is pushed in, the arm 40 engages and forces the nose of the spring 49 from its seat against the pin 53 in the extension, and, receiving said pin 53 in a pocket 52, formed in its end, moves the extension 48 and the attached plate 44, uncovering the ballot-slot opening and permitting the insertion of a cardboard or other ballot with the name of the candidate thereon. The parts are locked in this position by the gravity-latch 25, as before. In this movement the cut-off 45 of the plate 44 closes the inner opening of the ballot-slot, confining the ballot in the slot until the mechanism is released by the opening of the booth-door, when the ballot falls into the receiving-box 43. A second ballot cannot be introduced into the slot while the first remains therein. While performing the function just described, the arm 40 also actuates the slide 33 corresponding to the unregistered independent card in the dial, moving the units-wheel one tooth, in the manner hereinbefore described. When the voting is finished, the number of ballots in the receiving-box and the indication of the pointers of the unregistered independent counting-wheels should tally.

Many voters will desire to vote a "straight" ticket—that is, for the presidential electors, gubernatorial, and all other candidates of their party—and to facilitate this class of voting I mount upon and by screws or otherwise suitably secure to the series of cases composing the apparatus a distinct dial 14ª. This dial is composed of cards 15, like those before described, grouped radially, labeled with the names of the several political parties, and of colors indicative of such parties, and supported upon the front board of a box 54. In the interior of this box are arranged several sets of radially-grouped counter-wheels 21, actuated by the slides 33, as before; but in this dial the arm 40 is replaced by a pin 55, since there is no unregistered independent ballot mechanism and no need for the extended arm.

In the straight-ticket box the shaft 27ª is not provided with a finger 28 nor the latch-holder 29. The latch 25ª is a gravity-latch, as before, and when the rod 22 is pushed in to actuate one set of the counter-wheels it drops in front of the collar 23 and is raised from its locking position by a rod 56, projecting from an arm 57, connected with an axis 58, journaled in brackets 59 below the push-rod and latch. A vote on the Republican, Democratic, or other counter-wheels of this straight-ticket dial counts a vote for the candidates of that party for each office involved in the election. When a straight-ticket is voted, I provide means for locking all the other candidate-dials, which I term "split-ticket" dials, and when one of the split-ticket dials is voted the mechanism locks the straight-ticket dial from voting. Otherwise it would be possible for a voter to first vote the straight-ticket, counting a vote for all the candidates of a party for each office, and then cast another vote for such candidates on the split-ticket dials, and vice versa. I will now describe this means.

Upon the shaft $27^a$ of the straight-ticket dial is a wing 60, which rests upon the collar 23 of the push-rod 22 when said rod has been pushed inward to initiate a vote and is locked in its inward position. An arm 61 extends from the shaft $27^a$ a little removed from the wing, and to this arm and similar arms on the shaft 27 of the split-ticket dials a coupling-bar 62 is connected, a few loose links 63 being interposed in the rod to compensate for lost motion. When the push-rod of the straight-ticket dial is pushed in to vote, the collar 23 thereof comes beneath the wing 60, preventing the shaft $27^a$ from rotating and preventing also the rotation of the shaft or shafts 27 of the split-ticket dials through the medium of the coupling-bar 62. In this way the split-ticket mechanism cannot be voted, for the fingers 28 on the shaft or shafts 27 in the path of the collars 23 bar the inward movement of the push-rods. So when a push-rod of a split-ticket case is pushed in to vote the rotation of the shaft 27, through the coupling-rod 62, rotates the shaft $27^a$, bringing the wing 60 in front of the collar 23 of the push-rod of the straight-ticket dial, locking the mechanism from operation. A spring-brake 64 is secured at one end to the wall of the box 54, its other end embracing the shaft $27^a$ with sufficient tension to prevent the wing 60 falling behind the collar 23 of the push-rod by weight of said wing, coupling-rod, and connections, and thus without occasion rendering the straight-ticket mechanism inoperative.

I have described what may in some cases prove the preferable arrangement of straight-ticket dial; but this dial need not be arranged upon the other cases. In the general view of Fig. 1 of the drawings the left-hand dials are designated as "straight-ticket" dials, and this arrangement may be used with perhaps equal if not greater facility in general. In the arrangement last referred to the operation is the same as that just described, except that the shaft 27 carries the wing, and the coupling-bar 62 and connecting-arms are omitted, as will be understood.

When amendments to a State constitution are to be voted for or against, I set apart a dial for this purpose. For convenience I designate the right-hand dial in the top case the "amendment-dial." In this mechanism, which is shown in detail in Fig. 6 of the drawings, the card-dial and mechanism are arranged for voting "yes" or "no" to four amendments, the dial being otherwise like those already described. Likewise the push-rod 22, the sets of counting-wheels 21, and the slides 33 for actuating them are the same as in the split-ticket mechanism. Upon the push-rod 22 are arranged two loose collars 65 and 66, connected by a plurality of wires 67, forming an open cage free to move upon the push-rod. The latch 25 and the pins 38 and latch-holder 39 are omitted from this mechanism. In contact with the collar 65 when the same is in its normal position is a fixed pin 68 on the push-rod. Below said rod is a short shaft 69, journaled to rotate in a bracket 70. A spring-finger 71 projects from the shaft 69, its free end being in the path of movement of the cage. The operation of this amendment mechanism is as follows: The selection-button indicator $16^a$ is turned to the "yes" or "no" card of a particular amendment and the rod pushed in, initiating a vote through the pin 72 and selected slide 33, which moves the units-wheel one tooth, as will be understood. In this movement of the push-rod the pin 68 carries the movable cage rearward, the collar 65 passing the spring-finger 71, which immediately springs in front thereof, preventing the return of the cage. The push-rod may now be withdrawn manually and the indicator of the selection-button be moved to vote for another amendment, if there be one, and so on for as many amendments as may be proposed. It will be impossible to vote more than once for the same amendment, because the slide 33, which initiated the first vote, remains in its rearward position, and the push-rod can have no further action thereon. The vote for any amendment is not completed until the slide therefor is given its return movement by the lip $33^a$ on said slide engaging the collar 66, when the cage of which said collar forms part is forced to its outward or normal position by the spring 32 upon the opening of the door of the booth and the removal of the spring-finger 71.

There are offices, such as judgeships, school-commissioners, &c., which are held by a plurality of persons, and a voter is entitled to vote for each of the number of candidates to hold these offices. In order that this may be accomplished, I provide what I term "cumulative-voting" mechanism, as follows: A number of dials corresponding to the number of persons who are to be elected to hold the office are set apart, say three dials for three judges. In these dials the mechanism is like that of the amendment-voting mechanism with the following additions: Upon the shaft 27 above each push-rod 22 I arrange a loose collar 73, having depending ears 74, to which is secured a circuit-rod 75, extending along the three dials and having semicircular recesses 76, fitting over said push-rods, whereby the circuit-rod is maintained in proper longitudinal position. 77 indicates brackets secured to the front panel 11 of the case at a point between two push-rods 22, and journaled in said bracket is an axle 78, carrying a toothed wheel 79, the number of teeth of which is a matter of preference, say forty. The wheel 79 is provided with a stop 80, secured to its side, and to the axle 78 is secured one end of a flat spring 81, the other end of which is secured to a stud on one of the brackets 77. Intermediate its ends the spring 81 is adapted to be unwound from and to wind itself upon the axle 78, and its function is to return the toothed wheel 79 to a given or zero position, when it is free to obey the spring.

82 indicates an ear affixed to the circuit-rod 75 in the plane of the toothed wheel 79, and a pawl 83 has pivotal connection with said ear, as shown, its nose 84 being adapted to engage the teeth of the wheel 79 to rotate the latter. A spring dog-arm 85 projects from the shaft 69ª and engages the teeth of the wheel 79 to lock said wheel from returning to zero position under the action of the spring 81 until the proper time. The zero position of the wheel is determined by disks 86, secured to the brackets 77 on opposite sides of the wheel and provided with a series of perforations corresponding to the number of and coincident with the teeth of the wheel and adapted to receive a stop-pin. (Not shown.) The wheel 79 being first adjusted to its zero position by inserting stop-pins into the perforations of the disks, say, so that the wheel 79 may rotate three teeth before the stop 80 comes opposite the nose 84 of the pawl 83, preventing further movement of said wheel, the operation is as follows: A rod 22 is pushed in, its collar 23 engaging and moving the circuit-rod and the attached pawl 83. The nose 84 of the pawl moves the wheel 79 one tooth against the tension of the spring 81. At the same time the pin 68 forces the collars 65 66 and wires 67, forming the sliding cage, forward, where it is held by the spring-finger 71, the counting-wheels 21 of the selected candidate being actuated by the proper slide 33 through the medium of the arm 40. The dog-arm 85 will prevent the wheel 79 returning to zero, as will be obvious. A spring 75ª connects the circuit-rod 75 with the front wall of the casing to return said rod and the attached pawl 83 to normal position after each operation of a push-rod. The push-rod of another of the supposed three dials or of the same dial may now be pushed in to vote for another candidate, whereupon the like operation will be repeated as to that other candidate. Then a third vote may be similarly operated, when the stop 80 will come opposite the nose 84 of the pawl 83 and prevent further rotation of the wheel and consequently further operation of the mechanism.

When, as is sometimes the case, a voter is entitled to cast one vote for each of a plurality of candidates for a given office or at his election a plurality of votes for one candidate, the spring-finger 71 is removed, when the cage will return forwardly with the push-rod, restoring the slide 33, which had been actuated, thus leaving the parts in position where the voter may again vote for the same candidate or another, as he may desire, the stop-wheel preventing him from casting more votes than he is entitled to.

In order to prevent a voter operating simultaneously two or more rods 22 and thus voting for a candidate on two or more dials and moving the wheel but one tooth, I provide a raceway 87, secured to the front panel 11 of the case, in which is arranged a sectional barrier 88, (shown in detail in Fig. 13 of the drawings,) a section thereof being disposed between any two given push-rods 22 and each section having semicircular recesses 89 at its ends and elongated slots 90 near its ends, through which slots screws 91, secured to the front panel 11 of the case, pass. The collar 23 of each push-rod 22 is provided with a bevel portion 92, Fig. 11 of the drawings, which when a rod is pushed in wedges the sectional barrier apart, preventing the entrance of any other push-rod until the first has passed out.

In the drawings the cut-off wheel is shown rotating in a certain direction. It is obvious that it may be arranged to rotate in the opposite direction, any modification incident to such change being within the skill of the mechanic.

As has been before stated, the manipulation of the mechanism by voters operates to initiate the votes, which are completed by the opening of the door of the booth through appropriate mechanism, and this will now be described.

Referring to Fig. 4 of the drawings, the numeral 93 indicates a rod passing down along the front panels of the different cases of the apparatus in a channel 94, as in Fig. 5, branching around the push-rods 22 of the straight-ticket and other dials immediately therebelow in the several cases, as in Figs. 5 and 12 of the drawings. Secured to the shafts 27 of the split-ticket dials and the shafts 27ª of the straight-ticket dial are arms 95, one end of which project between pins 96 on the rod 93, as shown. Arms 97, connected with the shaft 69 of the amendment and 69ª of the cumulative dials, also project between pins 97ª, carried by said rod 93. The upper end of the rod 93 is connected to a bell-crank 98, pivoted to the wall of the booth, to which bell-crank is also secured one end of the link 7. To the free end of this link, as best shown in Figs. 4 and 8 of the drawings, is pivoted a lever 99, carrying a roller 100 and a pin 101, resting upon the link 7 when the parts are at rest, in which position they are maintained normally by a flat spring 102, secured to the lever and its pivot, as shown. The link passes above the door of the booth, slightly outside the latter, where the roller 100 projects into the path of the door. Now, when a voter opens the door to go from the booth, in the instance illustrated, the impact of the door forces the pin 101 firmly against the link 7, and in the continued movement of the door the door passes beneath and in contact with the roller, giving sufficient movement to the link 7 to raise the rod 93, said rod, in rising, releasing all the push-rods which have been locked in the several dials throughout the apparatus through the arms 95 and 97 and the pins 96 and 97ª on said rod, whereupon the push-rods of the straight and split ticket dials and the sliding cages of the amendment and cumulative mechanism are thrown into position available for the next voter by the springs 32. A further function is performed by the rod 93 in rising. The arm 57 of the straight-ticket dial projects between arms 103 on the rod 93, and when said rod is raised said arms rotate the axis 58, throwing the free end of a pitman 103ª, carried by said axis, and through a link 104 moves a slide 33 in the counting mechanism of said dial to initiate a count on the wheels, as will be understood, the return movement of the slide being caused when the rod 93 resumes its normal position by gravity when the door of the booth has passed away from the roller 100. Thus a count of every voter passing through the booth is made. It will be understood the closing of the door has no effect whatever upon the mechanism, merely swinging the roller 100 upon its axis, as in dotted lines, Fig. 8.

In many States the payment of a poll-tax is a prerequisite to the right to vote for candidates for certain offices, and the election officers have the duty to perform of preventing persons from voting who have failed to pay the tax. That this may be accomplished I provide a rod 105, Fig. 15, the handle end of which is outside the booth, the inner end of which is recessed, as at 106, to correspond to the contour of the push-rod 22, and which may be projected into contact with the rod behind its collar 23, thereby preventing the operation of the rod. So that the election officers may be located at a point where they can view all persons entering the booth at all times and not be required to leave such position the rod 105 may be located inside the booth and connected to a bell-crank 107, Fig. 1, to which is also connected a rod 108, extending outside the booth for manipulation.

The link 7 and the rods for preventing a person not entitled from voting may be and preferably are incased in pipes to prevent tampering therewith.

I have described a plan of arrangement of candidates for election purposes. This is one which to me appears simple and adequate. Other plans and arrangements of candidates and conduct of elections may be adopted or devised and put into practice with my apparatus, my invention relating to the mechanism and construction claimed herein and is not confined to the arbitray plan set forth.

As described, the several cases 9 comprised in the apparatus are secured together by cleats 10. My invention contemplates the construction of each case 9 in box-like sections, each section carrying a dial and corresponding counting and other mechanism.

Referring to Fig. 5, where this construction is best shown, the shafts 27 are constructed in short sections, each section being of a length corresponding to one of the sections composing the case 9. The several sections of the shaft are joined together by a coupling-sleeve 109, whose ends are recessed at 110, and pins 111 engage said recesses and pass into the shaft-sections, whereby all the sections will operate as a common shaft. The several sections composing a case 9 are secured together at the rear by plates 112, which lap and are fixed to adjoining sections. In this way voting-dials may be added to or taken from the apparatus, as occasion may require.

The indicators of each set of counting-wheels are identified by a number, as 1 2 3, &c., for convenience of reference in transferring the indications to tally-sheets.

Except as otherwise specifically set forth in the following claims, I do not confine myself to the details of construction shown and described.

I do not claim herein the combination of a series of keys, one key for each candidate, with another series of keys, one key for each straight party ticket, and connections whereby upon the operation of any one of the keys of either series all the keys of the other series will be locked from operation, as such is not of my invention.

What I claim is—

1. In a voting-machine the combination with a group of candidate-indicating devices and a group of sets of coincident counting-wheels, of a series of reciprocating slides having opposing cam-faces coöperating with said counting-wheels in their forward and return reciprocations, a push-rod having means for selecting and actuating a slide forwardly to initiate a vote-count on the selected set of wheels and means for imparting return reciprocation to the slides, substantially as described.

2. In a voting-machine, the combination with a group of candidate-indicating devices, and a coincident group of counting-wheels, of a series of reciprocating slides having opposing cam-faces engaging and actuating said counting-wheels in their forward and return movements, and a rotatable push-rod provided with means for imparting a forward reciprocation to said slides and means for imparting a return reciprocation thereto, substantially as described.

3. In a voting-machine, the combination with a booth, and a group of candidate-indicating devices arranged therein, of a group of coincident sets of counting-wheels, a series of slides coöperating with said counting-wheels, a rotatable push-rod, an arm carried by said rod to actuate a selected slide, a gravity-latch adapted to automatically lock said push-rod from further operation after it has actuated a slide, means operated by the door of the booth for releasing said latch, means connected with said push-rod to return it to normal position when the latch is released, and a collar on said push-rod for returning said slide to normal position, substantially as described.

4. In a voting-machine, the combination with a group of candidate-indicating devices and a coincident group of sets of counting-wheels, a rotatable push-rod provided with means for selecting and actuating a set of counting-wheels in a group, a collar on the push-rod, a shaft arranged above the push-rod and provided with a finger in the path of said collar, a latch-holder carried by said shaft, and a latch supported by said holder and adapted to fall in front of the collar on the rod when the shaft is rotated through the medium of said collar and finger, substantially as described.

5. In a voting-machine, the combination of a group of candidate-indicating devices, a coincident group of counting-wheels, a series of reciprocating slides engaging and actuating said counting-wheels in their forward and return reciprocations, a rotatable push-rod having means to engage said slides and impart a forward reciprocation thereto to initiate a vote count on said wheels, means for automatically locking the parts, means operated by the door of the booth for releasing the locking device, and means for automatically returning said push-rod and slide to normal position to complete the initiated vote count, substantially as described.

6. In a voting-machine, the combination with a group of candidate-indicating devices and a group of sets of coincident counting-wheels, of a series of reciprocating slides having opposing cam-faces coöperating with said counting-wheels in their forward and return reciprocations, a push-rod having means for selecting and actuating a slide forwardly to initiate a vote count on the selected set of wheels, and means operated by the door of the booth for imparting return reciprocation to the slides and completing the vote count, substantially as described.

7. In a voting-machine, the combination with a case provided with radially-grouped candidate-indicating devices including unregistered candidates, of normally-closed means for voting for an unregistered candidate, a rotatable rod adapted to be actuated to vote for registered candidates or to permit a vote for an unregistered candidate, means for preventing a vote for an unregistered candidate when a registered candidate has been voted, and counting mechanism operatively connected with said rod, substantially as described.

8. In a voting-machine the combination with a case having a ballot-slot, and a guard normally closing said slot, of a set of wheels for counting the ballots cast, a slide coöperating with said wheels, a push-rod provided with a device for engaging said guard and slide to open the ballot-slot and actuate the counting-wheels, substantially as described.

9. In a voting-machine, the combination with a case having a ballot-slot, and a guard normally closing said slot, of a set of wheels for counting the ballots cast, a slide coöperating with said wheels, a push-rod provided with a device to engage said guard and slide to operate the ballot-slot and actuate the counting-wheels, and means to prevent a voter from casting more than a single ballot, substantially as described.

10. In a voting-machine, the combination with a casing having a ballot-slot, and a guard normally closing said slot, consisting of a plate having a flanged end to close the mouth of the slot and a cut-off at the inner end of the slot, of means normally locking the guard to close the slot, a set of ballot-counting wheels, and a push-rod carrying a device to release the guard and move it from the ballot-slot to open the latter and to actuate the ballot-counting wheels, substantially as described.

11. In a voting-machine, the combination with a casing having a ballot-slot, of a guard for said slot consisting of a plate having a flanged end to close the mouth of the slot, and a cut-off at the inner end of the slot, a spring engaging said guard, to hold it normally in position to close the slot, a set of ballot-counting wheels, a slide coöperating with said wheels, and a push-rod provided with a device to release said guard, move it from the ballot-slot to open the latter and to actuate the counting-wheels, substantially as described.

12. In a voting-machine the combination with a casing having a group of candidate-indicating devices and a group of coincident sets of counting-wheels, one of the indicating devices and a corresponding set of wheels being for unregistered independent candidates, a ballot-slot, a guard normally closing said slot, and a rotatable push-rod arranged centrally of the indicating devices and provided with a selection-button and a device for moving the guard from the slot and actuating the set of counting-wheels, substantially as described.

13. In a voting-machine, mechanism to accommodate split-ticket voting or voting for individual candidates for office and straight-ticket voting or voting for all the candidates of a given party for all offices, consisting of a plurality of dials provided with candidate-indicating devices, corresponding counting-wheels, push-rods provided with means for operating said counting-wheels, collars on said push-rods, and means for locking either of said mechanisms from operating when a voter has voted upon the other, consisting of a shaft arranged above the push-rods of the mechanisms and a wing, as 60, and a finger, as 28, projecting in different directions from said shaft, whereby when one of the mechanisms is operated the wing or the finger, as the case may be, is held in position to prevent operation of the corresponding push-rod, substantially as described.

14. In a voting-machine the combination with two dials provided with candidate-indicating devices arranged one above the other and having corresponding counting-wheels, and collared push-rods having means for actuating said wheels, of means for locking either of said mechanisms from operation when the voter has voted upon the other, consisting of shafts arranged above the push-rods, a wing, as 60, carried by one of said shafts, a finger, as 28, carried by the other of said shafts, and a coupling-rod connecting said shafts, whereby when one of said mechanisms is operated the wing 60 or the finger 28, as the case may be, is held in position to prevent operation of the corresponding push-rod, substantially as described.

15. In a voting-machine, the combination with two dials provided with candidate-indicating devices arranged one above the other and having corresponding counting-wheels, and collared push-rods having means for actuating said wheels, of means for locking either of said mechanisms from operating when the voter has voted upon the other, consisting of shafts arranged above the push-rods, a wing, as 60, carried by one of said shafts, a finger, as 28, carried by the other of said shafts, said wing and finger projecting in different directions from said shafts, means for retaining said wing normally out of the path of the corresponding push-rod, and a coupling-rod connecting said shafts, whereby when one of said mechanisms is operated the wing 60 or the finger 28 as the case may be, is held in position to prevent operation of the corresponding push-rod, substantially as described.

16. In a voting-machine, mechanism for voting constitutional amendments or the like, consisting of an indicating-dial and vote-counting wheels, a rotatable push-rod provided with a selection-button and means for actuating a selected set of counting-wheels, a cage free to move upon said push-rod, means for moving the cage rearward with the push-rod and means for retaining it in that position, while the push-rod is free to be again operated, until released by mechanism operated by the door of the booth, substantially as described.

17. In a voting-machine, mechanism for voting for or against constitutional amendments or the like, consisting of an indicating-dial, and a group of counting-wheels, a series of slides coöperating with said wheels, a rotatable push-rod provided with a selection-button and a device to actuate a selected slide, a cage loose upon said rod, a pin carried by said rod adapted to engage said cage, a shaft, a spring-arm carried by said shaft adapted to spring in front of said cage and retain it in rearward position while the push-rod is free to be again operated independently thereof, and a spring operatively engaging said cage and adapted to return the same with the rod and slides to normal position when the spring-arm is released by mechanism operated by the door of the booth, substantially as described.

18. In a voting-machine, the combination with a group of counting-wheels and a rotatable push-rod for selectively actuating the same, of an adjustable toothed wheel provided with a stop, a shaft journaled in juxtaposition to the push-rod and provided with ears extending into the path of a collar on said push-rod, and a pawl carried by said ears and the nose of which is adapted to engage and rotate said toothed wheel, said pawl being actuated by said push-rod when the latter is operated, substantially as described.

19. In a voting-machine, the combination with a group of counting-wheels and a rotatable push-rod for selectively actuating the same, of an adjustable toothed wheel provided with a stop, a shaft journaled in juxtaposition to the push-rod and a pawl carried by said shaft in the path of a collar on said push-rod and adapted to engage and rotate said toothed wheel when the push-rod is operated, substantially as described.

20. In a voting-machine, the combination with a group of counting-wheels and a rotatable push-rod for selectively actuating the same, of an adjustable toothed wheel provided with a stop, a shaft journaled above and below said push-rod one of which is provided with a pawl arranged in the path of a collar on said push-rod and adapted to engage and rotate said toothed wheel when the push-rod is operated, and the other of which is provided with an arm to hold the wheel in the position to which it is rotated by the pawl, substantially as described.

21. In a voting-machine, the combination with a group of counting-wheels and a rotatable push-rod for selectively actuating the same, of an adjustable toothed wheel provided with a stop and a returning-spring, shafts journaled above and below said push-rod one of which is provided with a pawl arranged in the path of a collar on said push-rod and adapted to engage and rotate said toothed wheel when the push-rod is operated, and the other of which is provided with an arm to hold the wheel in the position to which it is rotated by the pawl against the tension of the returning-spring, substantially as described.

22. In a voting-machine, the combination with a group of counting-wheels, and a rotatable push-rod for selectively actuating the same, of a cage free to move on said push-rod, means for moving the cage rearward with the push-rod means for retaining it in that position while the push-rod is free to be again operated, an adjustable toothed wheel provided with a stop, and a pawl operated by the push-rod for rotating said wheel, substantially as described.

23. In a voting-machine, the combination of a group of counting-wheels, an adjustable toothed wheel provided with a stop, a series of slides coöperating with said counting-wheels, a pawl coöperating with said toothed wheel, and a rotatable push-rod positively engaging and actuating a selected slide and also said pawl, substantially as described.

24. In a voting-machine, the combination of a group of counting-wheels, a series of slides coöperating therewith, a toothed wheel provided with a stop, a pawl coöperating therewith, a rotatable push-rod, a cage free to move thereon, said push-rod provided with means engaging and actuating said slides, pawl and cage, substantially as described.

25. In a voting-machine, the combination with a plurality of dials having candidate-indicating devices, and corresponding counting-wheels, of rotatable push-rods for actuating said wheels, an adjustable toothed wheel journaled in juxtaposition to one of said rods and provided with a stop, a shaft journaled above said rods, a circuit-rod loosely supported by said shaft, and a pawl engaged and actuated by said circuit-rod and in turn engaging and rotating said toothed wheel, substantially as described.

26. In a voting-machine, the combination with a plurality of dials having candidate-indicating devices, and corresponding counting-wheels, of rotatable push-rods for actuating said wheels, an adjustable toothed wheel journaled in juxtaposition to one of said rods and provided with a stop, a shaft journaled above said push-rods, a circuit-rod loosely supported by said shaft, a pawl engaged and actuated by said circuit-rod and in turn engaging and rotating said wheel, and a sectional barrier coöperating with said push-rods to prevent the simultaneous operation of two or more thereof, substantially as described.

27. The combination with a voting-booth provided with a door, of a voting apparatus arranged in said booth comprising counting-wheels and push-rods for actuating the same, a shaft journaled above said push-rod and provided with a finger arranged in the path of the rod, a latch-holder normally supporting a gravity-latch out of engagement with said rod but permitting it to drop and lock said rod when the latter rotates said shaft by engaging said finger, a vertically-movable rod passing the push-rods, arms connecting the shaft to said rod, and a connection arranged in the path of the door of the booth for moving said rod to rotate said shaft and raise the gravity-latch from engagement with the push-rods, substantially as described.

28. The combination with a voting-booth provided with a door, of a voting apparatus arranged in said booth comprising counting-wheels and push-rods for actuating the same, a shaft arranged above said push-rods and provided with fingers arranged in the paths thereof, latch-holders normally supporting gravity-latches out of engagement with said rods but permitting them to drop and lock said rod when the latter rotates said shaft by engaging said fingers, a vertically-movable rod passing the push-rods, arms connecting the shaft to said rod, a bell-crank to which the upper end of the rod is connected, a link secured to said bell-crank, and a roller pivotally secured to said link and arranged in the path of the door, whereby when the door is opened the push-rod-locking devices are released and the vote count completed, substantially as described.

29. In a voting-machine, mechanism for counting the voters who pass into and out of the booth, consisting of a casing, a set of counting-wheels arranged therein, a slide coöperating with said wheels, a shaft journaled to the casing, a pitman carried by said shaft and a link connected to said pitman and said slide, a vertically-movable rod having a connection arranged in the path of the door of the booth, said rod connected to and adapted to rotate said shaft to actuate said slide through said connections, substantially as described.

30. In a voting-machine the combination with counting-wheels and a collared push-rod for actuating the same, of a cut-off device the handle end of which extends outside the voting-booth and the inner end of which is recessed and adapted to be projected behind the collar of the push-rod to prevent operation of the latter.

31. In a voting-machine the combination with counting-wheels and a collared push-rod for actuating the same, of a cut-off device the handle end of which is outside the voting-booth and the inner end of which is recessed and adapted to be projected behind the collar of the push-rod, and a bell-crank interposed in said device, substantially as described.

32. In a voting-machine the combination with a case comprising a number of sections secured together, voting mechanism arranged in each section comprising sectional shafts sleeved together throughout the case, substantially as described.

33. In a voting-machine, the combination of a case comprising a number of sections secured together and containing voting mechanism, and each containing also one part of a sectional shaft, said sections provided with openings in the shaft-line, and said sectional shafts sleeved together through said openings, substantially as described.

34. In a voting-machine, the combination with a case containing mechanism for counting and indicating votes, of a group of stationary candidate-indicating devices carried by said case as a dial divided into sections, a rotary push-rod located centrally in such dial and adapted to actuate said voting mechanism, a recessed guide-plate encircling the exposed end of said push-rod within the dial, and a selection-button upon the exposed end of said push-rod, movable over the face of said dial and adapted to be inserted toward said dial through any given recess of said guide-plate simultaneously with the pushing in of said push-rod to actuate the voting mechanism for the selected candidate, substantially as described.

35. In a voting-machine, the combination with a case containing mechanism for counting and indicating votes, of a dial carried by said case and containing in radial arrangement a series of registered candidates and a slot to vote for unregistered candidates, a single device movable in front of and over the face of said dial for the selection of any given registered candidate or of the slot to vote for an unregistered candidate, said device being operatively connected with means for counting a vote for such registered candidate and also with means for permitting and counting a vote for an unregistered candidate, substantially as described.

36. In a voting-machine, the combination with a case containing mechanism for counting and indicating votes, of a dial carried by said case and containing in radial arrangement a series of registered candidates and a slot to vote for unregistered candidates, a rotary push-rod located centrally in such dial, and adapted to actuate said mechanism, a recessed guide-plate encircling the exposed end of said push-rod and within the dial, and a selection-button operatively attached to the exposed end of said push-rod, movable over the face of said dial and adapted to be inserted toward said dial through any given recess of said guide-plate for the selection of any given registered candidate or of the slot to vote for an unregistered candidate, simultaneously with the pushing in of said push-rod to actuate the voting mechanism for the selected registered candidate or to open the ballot-slot to permit a vote for an unregistered candidate and count the same, substantially as described.

37. In a voting-machine, the combination with a booth and a group of counting-wheels and a rotatable push-rod for selectively actuating the same, of an adjustable toothed wheel provided with a stop and a returning-spring, shafts journaled above and below said push-rod one of which is provided with a pawl arranged in the path of a collar on said push-rod and adapted to engage and rotate said toothed wheel when the rod is operated, and the other of which is provided with an arm to hold the wheel in the position to which it is rotated by the pawl against the tension of the returning-spring; and means operated by the door of said booth to release said wheel by removing the arm from contact therewith, substantially as described.

38. In a voting-machine, the combination with a group of counting-wheels and a rotatable push-rod for selectively actuating the same, of a cage free to move on said push-rod, means for moving the cage rearward with the push-rod, means for returning it forwardly to its former position simultaneously with the return of the push-rod, said cage being adapted in its rearward and forward movements to actuate the means for counting a vote, leaving such vote-counting means ready for immediate further use, while the push-rod is free to be again operated either upon the same vote-counting means or upon any other in the same group; an adjustable toothed wheel provided with a stop, and a pawl operated by the push-rod for rotating said wheel, said stop being so adjusted as to block the rotation of the wheel, and consequently the pushing in of the push-rod, after said rod has been pushed in a determined number of times, substantially as described.

39. In a voting-machine, the combination with mechanism for counting votes, and with a plurality of dials containing candidate-indicating devices and each having a slot to vote for unregistered candidates, of rotatable push-rods located centrally one in each dial for actuating the vote-counting mechanism; an adjustable toothed wheel journaled in juxtaposition to one of said push-rods and provided with a stop and a returning-spring, a shaft journaled above said push-rods, a circuit-rod loosely supported by said shaft and engaged and actuated by each one of said push-rods when moving inwardly and a pawl operatively attached to said circuit-rod and engaging and actuating said toothed wheel, substantially as described.

40. In a voting-machine, the combination with a booth and with mechanism therein for counting votes, and with a plurality of dials containing candidate-indicating devices and each dial having a slot to vote for unregistered candidates, of rotatable push-rods located centrally one in each dial for actuating the vote-counting mechanism; an adjustable toothed wheel in juxtaposition to one of said push-rods and provided with a stop and a returning-spring, a shaft journaled above said push-rods, a circuit-rod loosely supported by said shaft and engaged and actuated by each one of said push-rods when moving inwardly, a pawl operatively attached to said circuit-rod and engaging and actuating said toothed wheel with each inward movement of any one of said push-rods, means for returning said pawl and circuit-rod to normal position when such push-rod is withdrawn to normal position, mechanism for holding said toothed wheel in the position to which it is rotated by the pawl against the tension of the returning-spring, and means operated by the door of said booth to release said wheel from the operation of said last-mentioned mechanism for holding it, substantially as described.

In testimony whereof I have hereunto set my hand in presence of two subscribing witnesses.

JOHN A. MARKOE.

Witnesses:
FREDERIC A. PIKE,
F. W. PIKE.